United States Patent
Myrah et al.

(10) Patent No.: US 8,694,826 B2
(45) Date of Patent: *Apr. 8, 2014

(54) SAS HOST CACHE CONTROL

(75) Inventors: Michael G Myrah, Cypress, TX (US); Balaji Natrajan, Spring, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 156 days.

This patent is subject to a terminal disclaimer.

(21) Appl. No.: 13/407,982

(22) Filed: Feb. 29, 2012

(65) Prior Publication Data

US 2013/0227341 A1 Aug. 29, 2013

(51) Int. Cl.
G06F 11/00 (2006.01)

(52) U.S. Cl.
USPC .......................................... 714/6.3

(58) Field of Classification Search
USPC .......................... 714/6.3, 6.31, 6.32
See application file for complete search history.

(56) References Cited

U.S. PATENT DOCUMENTS

| | | | |
|---|---|---|---|
| 5,790,775 A | 8/1998 | Marks et al. | |
| 7,366,846 B2 * | 4/2008 | Boyd et al. | 711/144 |
| 7,634,585 B2 | 12/2009 | Conley et al. | |
| 7,809,886 B2 | 10/2010 | Ashmore et al. | |
| 7,853,961 B2 * | 12/2010 | Nori et al. | 719/328 |
| 7,861,113 B2 | 12/2010 | Wang | |
| 2004/0268037 A1 * | 12/2004 | Buchanan et al. | 711/114 |
| 2005/0102549 A1 * | 5/2005 | Davies et al. | 714/4 |
| 2005/0210317 A1 * | 9/2005 | Thorpe et al. | 714/6 |
| 2007/0083707 A1 * | 4/2007 | Holland et al. | 711/114 |
| 2008/0040552 A1 * | 2/2008 | Tsuiji et al. | 711/131 |
| 2012/0054441 A1 * | 3/2012 | Nakashima et al. | 711/124 |
| 2012/0144082 A1 * | 6/2012 | Romero et al. | 710/300 |

* cited by examiner

Primary Examiner — Yolanda L Wilson
(74) Attorney, Agent, or Firm — Arthur Ortega

(57) ABSTRACT

A SAS method to control host controller failure that includes, in response to receipt of a failure signal indicating that a host controller has failed, sending a wakeup signal to a host cache module of the failed host controller to cause the host cache module to determine whether there is trapped data in the host cache module that has not been transferred to a storage system. In response to receipt of a cache state signal indicating that there is trapped data in the host cache module that has not been transferred to the storage system, initiating transfer of the trapped data from the host cache module of the failed host controller to a host cache module of another host controller.

20 Claims, 3 Drawing Sheets

SAS HOST CACHE CONTROL

BACKGROUND

Serial attached small computer system interface (SAS) is a communication protocol for enabling communication between computer devices. In the SAS protocol, SAS devices include initiator devices, target devices, and expander devices. Initiator devices are devices that can begin a SAS data transfer, while target devices are devices to which initiator devices can transfer data. Expander devices are devices that can facilitate data transfer between multiple initiator devices and multiple target devices. The SAS protocol utilizes a point-to-point bus topology. Therefore, if an initiator device is required to connect to multiple target devices, a direct connection can be established between the initiator device and each individual target device to facilitate each individual data transfer between the initiator device and each individual target device. A SAS switch is a SAS device that can include expander devices which can manage the connections and data transfer between multiple initiator devices and multiple target devices. A SAS fabric can include a network of initiator devices, target devices and expander devices.

BRIEF DESCRIPTION OF THE DRAWINGS

Certain examples are described in the following detailed description and in reference to the drawings, in which.

DETAILED DESCRIPTION OF SPECIFIC EXAMPLES

Serial attached small computer system interface (SAS) is a communication protocol for enabling communication between computer devices. A SAS fabric can include a SAS switch coupled to initiators such as hosts which may include host controllers with host cache modules to store data that can then be transferred to corresponding targets such as storage systems. The host controllers can be assigned or zoned to storage from a storage system. A host controller during normal operation can transfer data from its host cache module to its corresponding zoned storage. However, in the event of a host controller failure, there may be data trapped in its host cache module which the host controller may not be able to transfer to the corresponding zoned storage because of the host controller failure. If there is data trapped in the host cache module which has not been transferred or flushed to storage, then storage data may be potentially inconsistent. This situation may make it difficult to perform a failover operation which may include an operation to reassign or zone the storage from the failed host controller over to a replacement host controller.

This present application describes techniques to handle a host controller failover operation which includes detecting a host controller failure, transferring any data trapped in the host cache module of the failed controller to a host cache module of another host controller, and then zoning storage from the failed host controller to the replacement host controller. In one example, a SAS switch can communicate with the host controller over a SAS communication channel and communicate directly with the host cache module over a communication channel, such as Ethernet, that is different than communication with the host controller. In this way, it is possible to provide automatic failover from a failed host controller to a replacement host controller in an efficient manner. These techniques may help reduce the need to manually or physically remove the host cache module from the failed host controller and then physically couple the host cache module to the replacement host controller.

Figure 1:
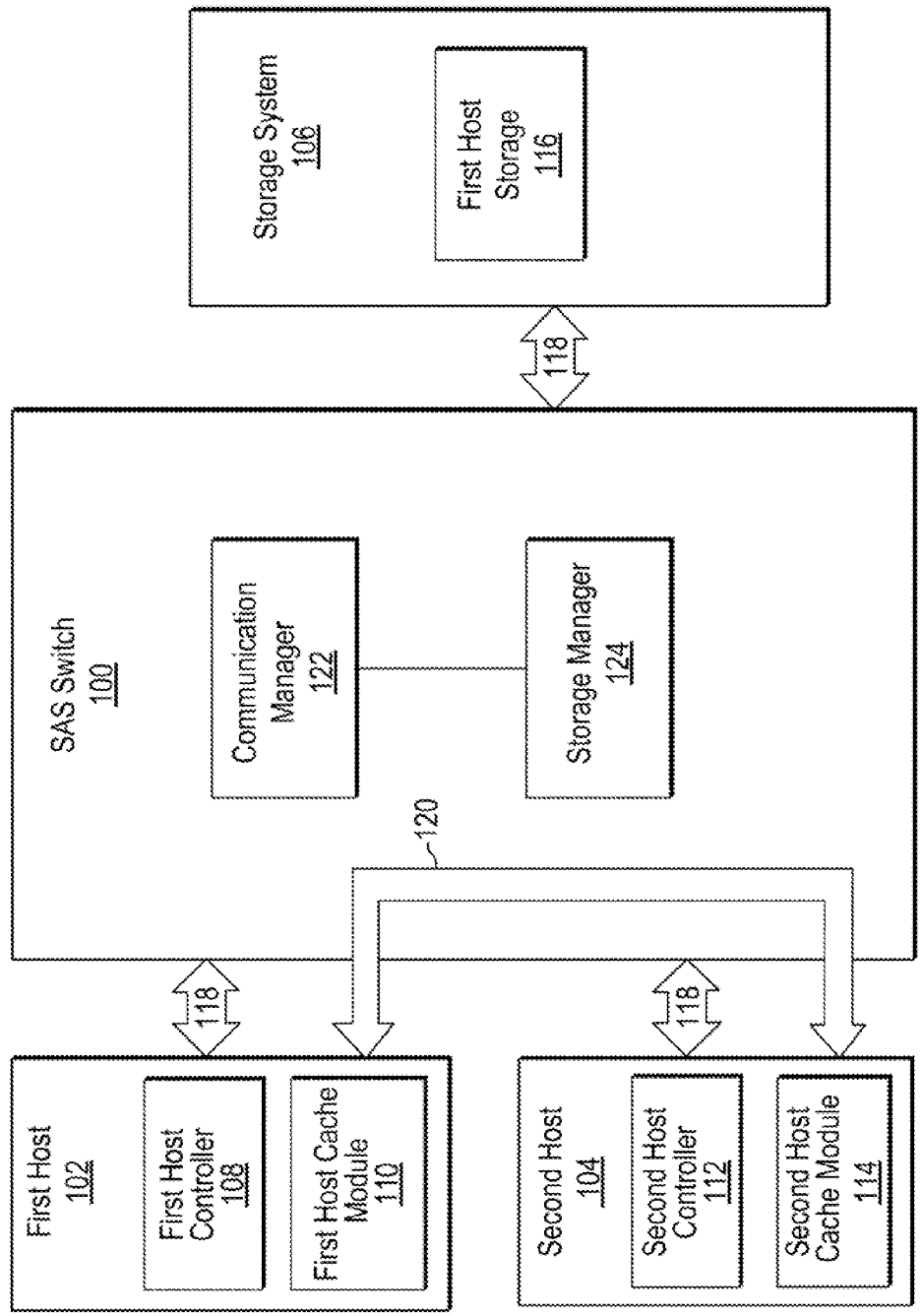
FIG. 1 is an example block diagram of a SAS switch to control a host cache module.

FIG. 1 is an example block diagram of a SAS fabric to handle a host cache module as part of a host controller failover. The SAS fabric may include a network of SAS protocol enabled devices including a SAS switch 100 capable of allowing communication between a plurality of SAS initiators such as a first host 102 and second host 104 and a SAS target such as a storage system 106. The first and second hosts 102, 104 include respective first and second host controllers 108, 112 and respective first and second host cache modules 110, 114.

The SAS switch 100 includes a communication manager 122 which can communicate with host controllers 108, 112 over a SAS communication channel 118. The SAS communication channel 118 can facilitate communication over a SAS fabric and can employ SAS protocols and include SAS commands and messages with information and data about host controllers 108, 112 including whether the host controllers are operational or have failed. In a similar manner, communication manager 122 can facilitate communicate with storage system 106 over SAS communication channel 118. The communication with storage system 106 can employ SAS protocols and include SAS commands and messages with information and data related to the storage and retrieval of data to/from the storage system and particularly with first host storage 116. In one example, the SAS protocol can include any of the SAS protocols including the SAS-2 protocol which is incorporated by reference herein.

The SAS switch 100 includes a storage manager 124 which can facilitate communicate with first and second host cache modules 110, 114 over a management communication channel 120. The management communication channel 120 can provide direct communication with host cache modules 110, 114. The communication with host cache modules 110, 114 can include commands and messages with information and data indicating status of data in the host cache modules including whether there is data stored and trapped in the host cache modules which may need to be flushed (transferred or stored) to storage system 106. The protocol employed by management communication channel 120 is separate and different than that of SAS communication channel 118 which employs a SAS protocol. The management communication channel 120 can employ communication protocols and technologies such as Ethernet and the like. Communication over SAS communication channel 118 is termed "in-band" because communication occurs within the SAS communication channel employing SAS protocols. In contrast, communication over management communication channel 120 is termed "out-of-band" relative to communication over SAS communication channel 118 because communication over the management communication channel takes place outside of the SAS communication channel. In other words, storage manager 124 can communicate directly with the host cache modules of host controllers to allow the transfer of data between the host cache modules over management communication channel 120. In this manner, storage manager 124 can facilitate the transfer of trapped data between host cache modules without the data having to flow through respective host controllers or over SAS communication channel 118.

This direct communication technique allows for a more efficient failover operation from a failed host controller to a replacement host controller compared to other transfer techniques such as transfer through host controllers.

The storage manager 124 is configured to receive from a host cache module a signal indicating whether there is data trapped in the host cache module of failed host controller. The storage manager 124 can respond to this signal by initiating transfer of the trapped data from the host cache module of the failed host controller to another host cache module of another host controller. Once the data has been transferred to the replacement host cache module, storage manager 124 can then proceed to perform a zone operation to assign or zone storage from storage system 106 associated with the failed host controller to a replacement host controller. In this manner, it is possible to provide automatic failover from a failed host controller to a replacement host controller, as explained in further detail below.

The first host 102 can include a SAS enabled data processing device capable of communicating over a SAS fabric employing SAS protocols over SAS communication channel 118. The first host 102 can be any data processing device such as a server computer, personal computer, mobile computing device and the like. The first host controller 108 can be configured to provide processing functionality to support first host 102. For example, first host controller 108 can include an array controller for managing storage arrays. The first host cache module 110 can include memory to store data that is frequently used by first host controller 108. The first host cache module 110 can include any storage memory that can have data stored and retrieved and include one or more of a non-volatile memory and the like. The first host cache module 110 can have a "wake on" feature to allow the cache module to be dormant for a period of time. For example, first host cache module 110 can be configured to require power to allow it to be dormant for a period of time, such as several hours, while still having enough power for communication over management communication channel 120. In one example, first host 102 can be an initiator device capable of generating multiple commands sent to SAS switch 100 and directed to storage resources associated with multiple targets. For example, first host controller 108 can be assigned (zoned) storage resources such as first host storage 116 from storage system 106. Once storage is assigned, first host controller 108 can generate and send to SAS switch 100 commands to store data and retrieve data from first host storage 116. In another example, first host 102 can comprise a plurality of server computers with array controllers to enable the servers to access and communicate with other devices on the SAS fabric. The array controllers can comprise storage controllers such as disk array controllers which can manage physical disk drives and present them to the servers as logical units. In some examples, array controllers can implement RAID functionality and may be referred to as RAID controllers. The structure and functionality of second host 104 and its respective second host controller 112 and second host cache module 114 are similar to those of first host 102 as described herein.

The hosts 102, 104 can be configured in one of two modes. The hosts 102, 104 can be configured to be in active mode which can be defined as a mode in which the hosts are powered on and ready to communicate with SAS switch 100. Alternatively, hosts 102, 104 can be configured to be in standby mode which can be defined as a mode in which the hosts are dormant ready to be used as replacement hosts. In one example, to illustrate operation, it can be assumed that first host 102 is configured to be in the active mode and second host 104 to be in the standby mode and is designated as the replacement host. The SAS switch 100 can perform a failover operation and transfer control from a failed host controller to the replacement host controller. It should be understood that this configuration is for illustrative purposes and other arrangements are possible. For example, first host 102 can be configured in the standby mode and second host 104 in the active mode. Two hosts 102, 104 are shown in communication with SAS switch 100. However, it should be understood that a different number of hosts can be in communication with SAS switch 100. The hosts 102, 104 are shown as each having a single respective host controller and host cache module. However, it should be understood that hosts 102, 104 can be configured with a plurality of host controllers and host cache modules or a different number of such components.

The SAS switch 100 is shown in communication with a SAS target such as storage system 106. The storage system 106 may include any data processing device capable of managing storage resources and with functionality for storage of data and subsequent retrieval by initiators such as hosts 102, 104. In one example, storage system 106 may include storage drive bays which may contain one or more of a non-volatile memory, a volatile memory, and/or one or more storage devices such as storage drives, such as disk drives, solid state drives, optical drives, tape drives, and the like. In the example shown in FIG. 1, SAS switch 100 can be assigned a first zone group comprising first host storage 116 assigned to first host controller 108. However, continuing with this example, SAS switch 100 may not assign a zone group to second host 104 because the second host is configured to be in the standby mode and ready for use as a replacement host. It should be understood that other storage zone group assignments and configurations may be possible.

The communication manager 122 can provide an interface for communicating with SAS devices over the SAS fabric. For example, communication manager 122 can provide an interface to communicate with SAS initiator devices such as hosts 102, 104. The communication manager 122 can also provide an interface to communicate with SAS target devices such as storage system 106. The communication manager 122 can perform standard SAS discovery processes to identify SAS devices on the SAS fabric such as hosts 102, 104 and storage system 106. The SAS discovery process can include sending SAS discovery commands over the SAS fabric and checking responses from the SAS fabric. The communication manager 122 can exchange data and commands with hosts 102, 104 and with storage system 106. The communication manager 122 can communicate with host controllers 108, 112 and with storage system 106 over SAS communication channel 118. The SAS communication channel 118 employs the SAS protocol. The communication channel can include PHYs which are specific to the SAS protocol and can represent physical devices for communication. The SAS switch 100 can include a plurality of ports associated with PHYs which can comprise electronic transceivers for exchanging data and requests or commands between the switch and hosts 102, 104 and storage system 106. A SAS port associated with a single PHY is referred to as a narrow port whereas a SAS port associated with two or more PHYs is referred to as a wide port.

A SAS port can be associated with a unique SAS address. In one example, SAS switch 100 may be assigned its own unique SAS address. The storage system 106 may include storage components such as hard disk drives and each of these components may be assigned its own unique SAS address. Likewise, host controllers 108, 112 may be assigned their own unique SAS address. The SAS unique address assigned to SAS switch 100, storage system 106 and host controllers 108, 112 may allow these devices to be uniquely identified and allow them to communicate with the SAS switch over the SAS fabric that includes SAS communication channel 118. In another example, a host controller may have multiple ports and each port may be assigned a unique SAS address. For ease of illustration, host controllers 108, 112 include a single SAS port and are assigned a single unique SAS address.

The storage manager 124 can assign portions of storage system 106 to hosts 102, 104. For example, storage manager 124 can assign first host storage 116 to a first zone group and then assign that zone group to first host 102 to thereby provide the first host with access to the first host storage. As explained above, first host 102 is configured to be in active mode and therefore is assigned storage. However, second host 104 is configured to be in standby mode and therefore is not assigned storage from storage system 106. In this manner, storage manager 124 can perform a failover operation by transferring control from a failed host, such as first host 102, to a replacement host, such as second host 104, in case the first host experiences a failure. A host failure can include a condition wherein the host is no longer communicating with SAS switch 100, is offline or any other condition in which the host is no longer fully operational. A failover operation can include the transfer of any data that is trapped in the host cache module of the failed host controller to the host cache module of the replacement host controller. The failover operation can also include assigning the zone group associated with a failed host controller, such as first host controller 108, to a replacement host controller such as second host controller 112. In this manner, first host controller 108 can be replaced by second host controller 112 which can then access first host storage 116 which was previously assigned to the first host controller.

The storage manager 124 can perform a failover operation which can include initiating the transfer of any data that is trapped in the host cache module of the failed host controller to the host cache module of the replacement host controller. For example, first host 102 may be configured to be in the active mode which means that first host controller 108 can process data and have data stored in its first host cache module 110. Further, first host storage 116 may be assigned to a zone group associated with first host 102. The second host 104 may be configured in standby mode and may not be assigned to a zone group of storage of storage system 106. In this case, second host 104 is in standby mode which means second host controller 112 is not currently processing data and does not have any data stored in its second host cache module 114. As explained below in further detail, SAS switch 100 is capable of performing a failover operation by transferring control from a failed host, such as first host 102, to a replacement host, such as second host 104 based upon detection of failure of the first host controller.

The communication manager 122 can be configured to check whether a host controller has failed. For example, to illustrate, it can be assumed that first host controller 108 failed and communication manager 122 can detect this failure. The communication manager 122 can check whether it received a failure signal from first host controller 108 indicating whether the first host controller failed. In one example, the failure signal can be a SAS command indicating a host failure. The command can be sent from first host controller 108 to communication manager 122 over SAS communication channel 118. In another example, the failure signal can be in the form of a "heart beat" mechanism where the communication manager 122 sends a SAS command to first host controller 108, and if it is operational, it responds to switch 100 within a predetermined period of time with a SAS command indicating that it is operational. On the other hand, if first host controller 108 failed, then it does not to respond to switch 100 with a SAS command within the predetermined period of time. In this case, switch 100 interprets the absence of a response as an indication that first host controller 108 failed. In other words, if no response is received within the predetermined period of time, then a host failure condition may be assumed.

In the event of a host controller failure, storage manager 124 can perform an operation to transfer control from the host controller that failed to a replacement host controller based on whether there is any data trapped in the host cache module of the failed host controller. To illustrate, continuing with the above example, once communication manager 122 detects that first host controller 108 failed, storage manager 124 can then determine whether there is any data trapped in first host cache module of first host controller which has failed. In one example, storage manager 124 can send a wakeup signal to first host cache module 110 of the failed host controller which causes the first cache module to determine whether there is data trapped in it. In the current example, storage manager 124 can send the wakeup signal to first host cache module 110 which causes it to determine whether there is data trapped in it. In one example, the wakeup signal can be in the form of a command or message from storage manager 124 to first host cache module 110 where the command is sent over management communication channel 120. Once the wakeup signal is sent, then storage manager 124 can check or monitor whether first host cache module 110 has responded with a cache state signal indicating whether there is data trapped in it.

If first host cache module 110 determines that there is no data trapped in it, then it sends to storage manager 124 a cache state signal indicating that there is no data is trapped in it meaning that all data in it has been transferred to first host storage 116. In this case, storage manager 124 can proceed to reassign storage from first host 102 to second host 104 which includes performing a zone operation to reassign storage from failed host controller 108 to replacement host controller 112.

On the other hand, if host cache module 110 determines that there is data trapped in it, then it sends to storage manager 124 a cache state signal indicating that data is trapped in it which means that it has stored data that has not been transferred to first host storage 116. In that case, then storage manager 124 can initiate transfer of the trapped data from first host cache 110 to second host cache module 114. In one example, storage manager 124 can transfer the trapped data over management communication channel 120.

Once storage manager 124 completes the transfer of data trapped in the host cache module of the failed host controller to a host cache module of another host controller, it can proceed to reassign storage which can include performing a zone operation to reassign storage from failed host controller 108 to replacement host controller 112.

Moreover, storage manager 124 can initiate transfer of the trapped data from the host cache module of the failed host controller to the host cache module of the replacement host controller while the host cache module having the trapped data is connected to the failed host controller. In the current example, it is assumed that first host storage 116 is assigned to a zone group associated with first host 102. It can be further assumed that second host 104 is configured in standby mode and it is not assigned to a zone group of storage from storage system 106. In this case, storage manager 124 can reassign the zone group associated with first host 102 to second host 104. As this example illustrates, switch 100 is capable of performing a failover operation by transferring control from first host 102 to second host 104 in the event of failure of first host controller 108.

In one example, the present application describes techniques to handle a host controller failure that includes detecting a host controller failure and transferring any data trapped in the host cache module of the failed controller to a host cache module of another host controller. In this manner, it is possible to provide automatic failover from a failed host controller to a replacement host controller in an efficient manner. These techniques may help reduce the need to manually or physically remove the host cache module from the failed host controller and then have to physically reconnect the host cache module to the replacement host controller.

The configuration of the SAS fabric of FIG. 1 is for illustrative purposes and it should be understood that a different configuration can be employed to implement the techniques of the present application. For example, the functionality of communication manager 122 and storage manager 124 are shown as part of SAS switch 100, however, it should be understood that other configurations are possible. To illustrate, in one example, the functionality of communication manager 122 can be combined with that of storage manager 124. In another example, the functionality of communication manager 122 and storage manager 124 can be distributed among a plurality of devices located locally, remotely or a combination thereof. The functionality of SAS switch 100 and its components can be implemented in hardware, software, or a combination thereof. The techniques of the present application are shown as part of SAS fabric architecture, however, it should be understood that the techniques of the present application can be applicable in other architectures such as Storage Area Networks (SAN), Direct Attached Networks (DAN) or other network architectures. FIG. 1 shows SAS switch 100 as providing functionality for managing host controller failure and cache module failover operation. However, it should be understood that other SAS enabled devices can be used to perform this functionally. For example, SAS switch 100 may include a chassis with management devices and one or more SAS expanders where the expanders can perform the failover functionality described herein.

Figure 2:
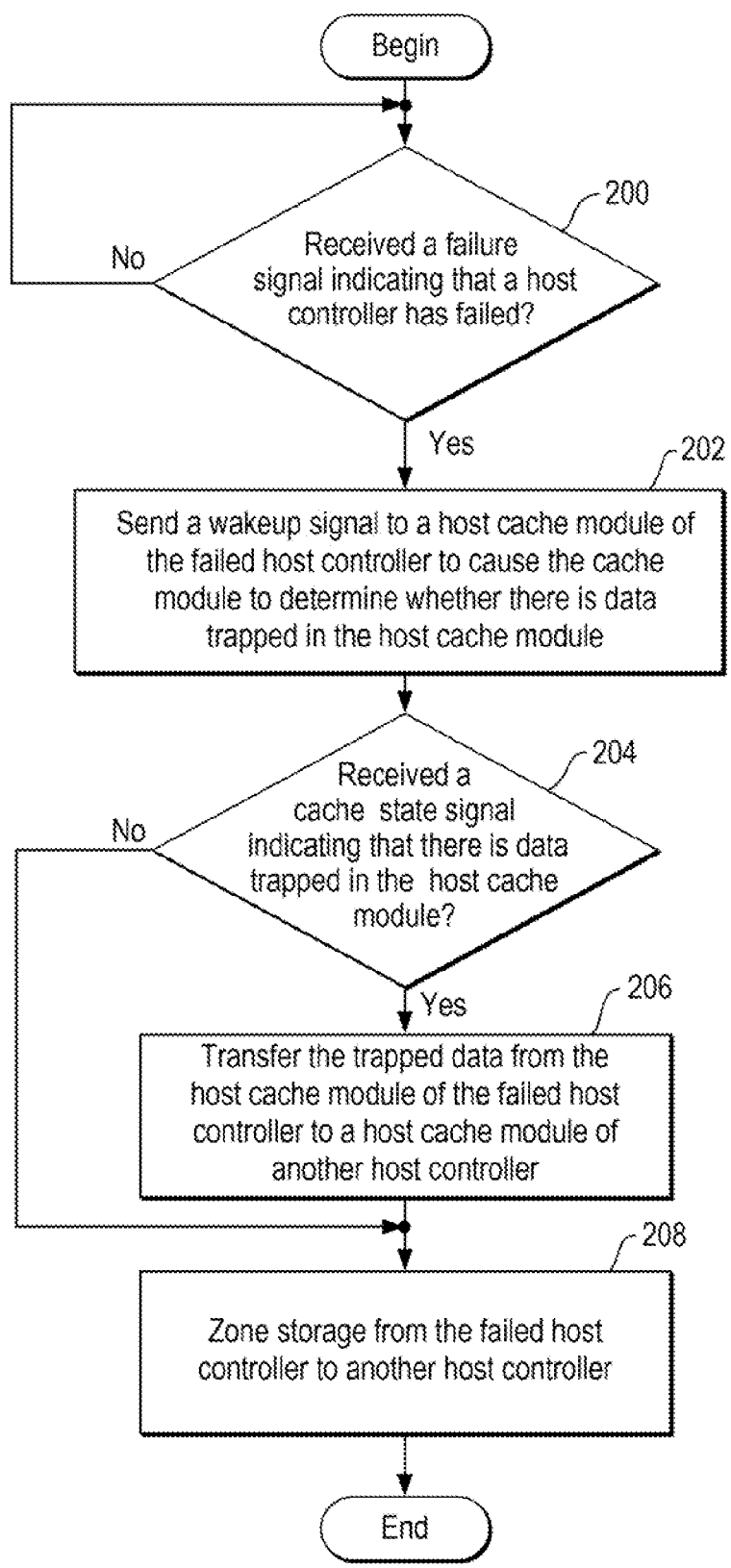
FIG. 2 is an example process flow diagram of a method for a SAS switch to control a host cache module.

FIG. 2 is an example process flow diagram of a method of operating SAS switch 100 to control a host cache module of a failed host controller.

To illustrate, in one example, it will be assumed that first host 102 and second host 104 are coupled to SAS switch 100 as shown in FIG. 1. Further, it can be assumed that first host 102 is configured in the active mode along with first host controller 108 and first host cache module 110. Further, it can be assumed that first host storage 116 is assigned to a zone group associated with first host 102. It can be further assumed that second host 104 is configured in standby mode and it is not assigned to a zone group of storage from storage system 106. The second host 104 is designated as the replacement host in the event of a failure of first host 102. As explained below in further detail, SAS switch 100 is capable of performing a failover operation by transferring control from first host 102 to second host 104 in the event of failure of first host controller 108.

The method may begin at block 200, where SAS switch 100 checks whether it received a failure signal from first host controller 108 indicating whether the first host controller failed. If first host controller 108 does not send a failure signal to switch 100 indicating that it failed, then processing proceeds back to block 200 where SAS switch 100 continues to monitor for a failure signal from the first host controller. On the other hand, if first host controller 108 does send a failure signal to switch 100 indicating that it failed, then processing proceeds to block 202 to further process the failure signal. In one example, the failure signal can be a SAS command indicating a host failure. The command can be sent from first host controller 108 to communication manager 122 over SAS communication channel 118. In other example, the failure signal can be in the form of a "heart beat" signal where the communication manager 122 sends a SAS command to first host controller 108. In this case, if first host controller 108 is operational then it responds to switch 100 within a predetermined period of time with a SAS command indicating that it is operational. On the other hand, if first host controller 108 failed, then it does not to respond with a SAS command to switch 100 within the predetermined period of time. In this case, switch 100 interprets the absence of a response as an indication that first host controller has failed.

At block 202, SAS switch 100 sends a wakeup signal to the host cache module 110 of the failed host controller which causes the first cache module to determine whether there is data trapped in it. In the current example, storage manager 124 sends the wakeup signal to first host cache module 110 which causes it to determine whether there is data trapped in it. In one example, the wakeup signal can be in the form of a command or message from storage manager 124 to first host cache module 110 where the command is sent over management communication channel 120. Once the wakeup signal is sent, then processing proceeds to block 204 which can include having storage manager 124 checking whether first host cache module 110 has responded with a cache state signal indicating whether there is data trapped in it.

At block 204, SAS switch 100 checks whether the host cache module responded with a cache state signal indicating whether there is data trapped in it. In one example, first host cache module 110 responds to the wakeup signal by determining whether there is data trapped in it. If first host cache module 110 determines that there is data trapped in the first host cache module, then it sends to switch 100 a cache state signal indicating that data is trapped in it which means that it has stored data that has not been transferred to first host storage 116. In that case, then processing can proceed to block 206 where switch 100 initiates the transfer of the trapped data from first host cache 110 to second host cache module 114, as explained below. On the other hand, if first host cache module 110 determines that there is no data trapped in it, then it sends to switch 100 a cache state signal indicating that there is no data trapped in it meaning that all data in it has been transferred to first host storage 116. In that case, then processing proceeds to block 208 where switch 100 can proceed to reassign storage from first host 102 to second host 104 which can include to perform a zone operation to reassign storage from the failed host controller to another host controller, as explained below.

At block 206, SAS switch 100 transfers the data trapped in the host cache module of the failed host controller to a host cache module of another host controller. In the current example, switch 100 initiates the transfer of trapped data from first host cache module 110 of first host controller 108 which failed to second host cache module 114 of second host controller 112. In one example, storage manager 124 can initiate the transfer of the data over management communication channel 120.

At block 208, SAS switch 100 reassigns storage that includes performing a zone operation to reassign storage from the failed host controller to another host controller. In one example, once switch 100 completes the transfer of data from the failed host cache module to the host cache module of the replacement host, then the switch can perform the zone operation. The transfer of data can include having switch 100 stream data through communication channel 120 including reading the data from the failed host cache and writing it to the new host cache module. In the current example, it is assumed that first host storage 116 is assigned to a zone group associated with first host 102. It can be further assumed that second host 104 is configured in standby mode and it is not assigned to a zone group of storage from storage system 106. In this case, storage manager 124 reassigns the zone group associated with first host 102 to second host 104.

As this example illustrates, switch 100 is capable of performing a failover operation by transferring control from first host 102 to second host 104 in the event of failure of first host controller 108. In one example, the present application describes techniques to handle a host controller failure that includes detection of a host controller failure, transfer of any data trapped in the host cache of the failed controller to a host cache module of another host controller, and reassignment or rezone of any storage to the replacement host. In this manner, it is possible to provide automatic failover from a failed host controller to a replacement host controller.

The above method describes an example of operation, however, it should be understood that the present techniques can be employed with other configurations and examples. For example, the above illustrates the failure of first host controller 108 and second host controller 112 as a replacement for the first host controller. However, it should be understood that the techniques of the present application can be employed in other scenarios such as adding a third host to be used as a replacement for failure of first host controller 108 or failure of second host controller 112.

Figure 3:
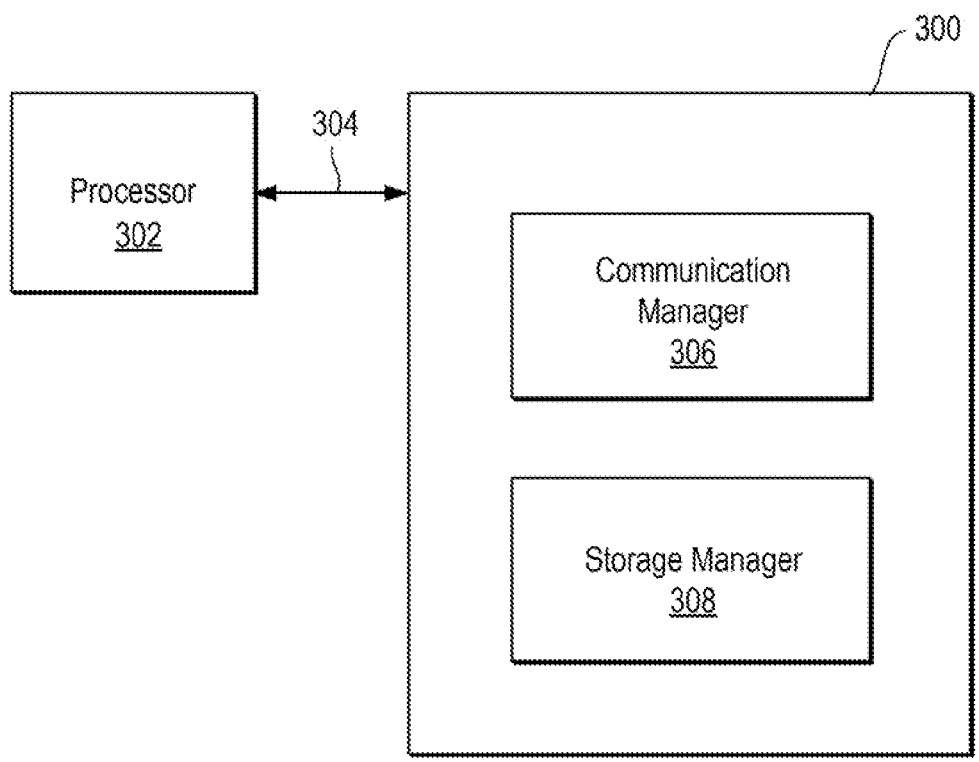
FIG. 3 is an example block diagram showing a non-transitory, computer-readable medium that stores instructions for a SAS switch to control a host cache module.

FIG. 3 is an example block diagram showing a non-transitory, computer-readable medium that stores code for operating a SAS switch to handle a cache module of a failed host controller. The non-transitory, computer-readable medium is generally referred to by the reference number 300 and may be included in SAS switch 100 of the SAS fabric described in relation to FIG. 1. The non-transitory, computer-readable medium 300 may correspond to any typical storage device that stores computer-implemented instructions, such as programming code or the like. For example, the non-transitory, computer-readable medium 300 may include one or more of a non-volatile memory, a volatile memory, and/or one or more storage devices. Examples of non-volatile memory include, but are not limited to, electrically erasable programmable read only memory (EEPROM) and read only memory (ROM). Examples of volatile memory include, but are not limited to, static random access memory (SRAM), and dynamic random access memory (DRAM). Examples of storage devices include, but are not limited to, hard disk drives, compact disc drives, digital versatile disc drives, optical drives, and flash memory devices.

A processor 302 generally retrieves and executes the instructions stored in the non-transitory, computer-readable medium 300 to operate the SAS switch in accordance with an example. In an example, the tangible, machine-readable medium 300 can be accessed by the processor 302 over a bus 304. A first region 306 of the non-transitory, computer-readable medium 300 may include communication manager 122 functionality as described herein. A second region 308 of the non-transitory, computer-readable medium 300 may include storage manager 124 functionality as described herein.

Although shown as contiguous blocks, the software components can be stored in any order or configuration. For example, if the non-transitory, computer-readable medium 300 is a hard drive, the software components can be stored in non-contiguous, or even overlapping, sectors.

What is claimed is:

1. A SAS switch to control host controller failure comprising:
    a communication manager to, in response to receipt of a failure signal indicating that a cache module of a host controller has failed, send a wakeup signal to the host cache module of the failed host controller to cause the host cache module to determine whether there is trapped data in the host cache module that has not been transferred to a storage system; and
    a storage manager to, in response to receipt of a cache state signal indicating that there is trapped data in the host cache module that has not been transferred to the storage system, then initiate transfer of the trapped data from the host cache module of the failed host controller to a host cache module of another host controller.

2. The switch of claim 1, wherein the storage manager is to communicate with the host cache module of the failed controller over a management communication channel and the communication manager is to communicate with the failed host controller over a SAS communication channel that is separate from the management communication channel.

3. The switch of claim wherein the host cache modules include non-volatile memory.

4. The switch of claim 1, wherein the storage manager is to zone storage from the storage system associated with the failed host controller to the other host controller.

5. The switch of claim 1, wherein the storage manager is to zone storage from the storage system associated with the failed host controller to the other host controller after the data trapped in the host cache module of the failed host controller has been transferred to the host cache module of the other host controller.

6. The switch of claim 1, wherein the storage manager is to initiate transfer of the trapped data from the host cache module of the failed host controller to the host cache module of the other host controller while the host cache module having the trapped data is connected to the failed host controller.

7. The switch of claim 1, wherein the storage manager is to perform a discovery operation of the host controllers over a SAS communication channel.

8. A method for a SAS switch to control host controller failure comprising:
    in response to receipt of a failure signal indicating that a host controller has failed, sending a wakeup signal to a host cache module of the failed host controller to cause the host cache module to determine whether there is trapped data in the host cache module that has not been transferred to a storage system; and
    in response to receipt of a cache state signal indicating that there is trapped data in the host cache module that has not been transferred to the storage system, initiating transfer of the trapped data from the host cache module of the failed host controller to a host cache module of another host controller.

9. The method of claim 8, wherein communication with the host cache module of the failed host controller occurs over a management communication channel and communication with the host controller occurs over a SAS communication channel that separate from the management communication channel.

10. The method of claim 8, wherein communication with the host cache module of the failed host controller occurs over a management communication channel and communication with the storage system occurs over a SAS communication channel that is separate from the management communication channel.

11. The method of claim 8, further comprising performing a zone function that includes zoning storage from the storage system associated with the failed host controller to the other host controller.

12. The method of claim 8, further comprising performing a zone function that includes zoning storage from the storage system associated with the failed host controller to the other host controller after the data trapped in the host cache module of the failed host controller has been transferred to the other host controller.

13. The method of claim 8, wherein initiating transfer of the trapped data from the host cache module of the failed host controller to the host cache module of the other host controller occurs while the host cache module having the trapped data is connected to the failed host controller.

14. The method of claim 8, further comprising performing a discovery operation of the host controllers over a SAS communication channel.

15. A non-transitory computer-readable medium having computer executable instructions stored thereon for a SAS switch to control host controller failure, the instructions are executable by a processor to:
   in response to receipt of a failure signal indicating that a host controller has failed, send a wakeup signal to a host cache module of the failed host controller to cause the host cache module to determine whether there is trapped data in the host cache module that has not been transferred to a storage system; and
   in response to receipt of a cache state signal indicating that there is trapped data in the host cache module that has not been transferred to the storage system, initiate transfer of the trapped data from the host cache module of the failed host controller to a host cache module of another host controller.

16. The non-transitory computer readable medium of claim 15 further comprising instructions that if executed cause a processor to:
   communicate with the host cache module of the failed controller over a management communication channel and communicate with the host controller over a SAS communication channel that is separate from the management communication channel.

17. The non-transitory computer readable medium of claim 15 further comprising instructions that if executed cause a processor to:
   perform a zone function that includes to zone storage from the storage system associated with the failed host controller to the other host controller.

18. The non-transitory computer readable medium of claim 15 further comprising instructions that if executed cause a processor to:
   initiate transfer of the trapped data from the host cache module of the failed host controller to the host cache module of the other host controller while the host cache module having the trapped data is connected to the failed host controller.

19. The non-transitory computer readable medium of claim 15 further comprising instructions that if executed cause a processor to:
   perform a discovery operation of the host controllers over a SAS communication channel.

20. The non-transitory computer readable medium of claim 15 further comprising instructions that if executed cause a processor to:
   perform a zone function that includes to zone storage from the storage system associated with the failed host controller to the other host controller after the data trapped in the host cache of the failed host controller has been transferred to the other host controller.

* * * * *

UNITED STATES PATENT AND TRADEMARK OFFICE
CERTIFICATE OF CORRECTION

| | | |
|---|---|---|
| PATENT NO. | : 8,694,826 B2 | Page 1 of 1 |
| APPLICATION NO. | : 13/407982 | |
| DATED | : April 8, 2014 | |
| INVENTOR(S) | : Michael G Myrah et al. | |

It is certified that error appears in the above-identified patent and that said Letters Patent is hereby corrected as shown below:

In the Claims

In column 10, line 23, in Claim 3, delete "claim" and insert -- claim 1, --, therefor.

In column 10, line 60, in Claim 9, after "that" insert -- is --.

Signed and Sealed this
Twelfth Day of August, 2014

Michelle K. Lee
*Deputy Director of the United States Patent and Trademark Office*